United States Patent
Barzik et al.

(10) Patent No.: US 10,637,921 B2
(45) Date of Patent: *Apr. 28, 2020

(54) SELF-EXPANDING SOFTWARE DEFINED COMPUTING CLUSTER

(71) Applicant: INTERNATIONAL BUSINESS MACHINES CORPORATION, Armonk, NY (US)

(72) Inventors: Zah Barzik, Rishon Lezion (IL); Maxim Kalaev, Petach Tikva (IL); Eli Koren, Shoham (IL); Amit Margalit, Hod-Hasharon (IL); Eran Tzabari, Tel Aviv (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/960,920

(22) Filed: Apr. 24, 2018

(65) Prior Publication Data

US 2018/0241808 A1 Aug. 23, 2018

Related U.S. Application Data

(63) Continuation of application No. 14/865,522, filed on Sep. 25, 2015, now Pat. No. 9,992,276.

(51) Int. Cl.
*H04L 29/08* (2006.01)
*G06F 9/455* (2018.01)
(Continued)

(52) U.S. Cl.
CPC .............. *H04L 67/104* (2013.01); *G06F 8/63* (2013.01); *G06F 9/45558* (2013.01);
(Continued)

(58) Field of Classification Search
CPC .............. H04L 41/0806; H04L 41/0896; H04L 27/3488; G06F 15/16; G06F 2009/45562; G06F 8/63
(Continued)

(56) References Cited

U.S. PATENT DOCUMENTS

| | | | |
|---|---|---|---|
| 5,898,863 A | 4/1999 | Ofer et al. | |
| 6,088,333 A * | 7/2000 | Yang | H04Q 11/0478 370/238 |

(Continued)

FOREIGN PATENT DOCUMENTS

WO 02089014 A1 11/2002

OTHER PUBLICATIONS

Darsana, "Integrating Cloud Service Deployment Automation with Software Defined Environments," Institute of Parallel and Distributed Systems, University of Stuttgart, 2014 (71 pages).

(Continued)

*Primary Examiner* — Tesfay Yohannes
(74) *Attorney, Agent, or Firm* — Griffiths & Seaton PLLC

(57) ABSTRACT

Methods, computing systems and computer program products implement embodiments of the present invention that include initializing multiple computing nodes to execute one or more software applications that provide a computing service, each of the computing nodes having a respective set of configuration data. Examples of the services include storage services, computational services and web service. Subsequent to deploying the multiple computing nodes as a software defined computing (SDC) cluster, an additional computing node is initialized using a given set of configuration data, and the additional computing node is added to the SDC cluster. In some embodiments, the additional node can be initialized and added to the SDC cluster in response to detecting a condition in the SDC cluster. In alternative (Continued)

embodiments, the additional node can be initialized and added to the SDC cluster in response to receiving a request to add an additional service to the SDC cluster.

12 Claims, 5 Drawing Sheets

(51) Int. Cl.
*H04L 12/24* (2006.01)
*G06F 8/61* (2018.01)

(52) U.S. Cl.
CPC ...... *H04L 41/0806* (2013.01); *H04L 41/0896* (2013.01); *H04L 67/02* (2013.01); *H04L 67/025* (2013.01); *H04L 67/1097* (2013.01); *H04L 67/2842* (2013.01); *G06F 2009/45562* (2013.01)

(58) Field of Classification Search
USPC .......................................... 709/205; 370/238
See application file for complete search history.

(56) References Cited

U.S. PATENT DOCUMENTS

| | | | |
|---|---|---|---|
| 6,400,682 B1* | 6/2002 | Regula | G01R 31/08 370/223 |
| 6,826,613 B1 | 11/2004 | Wang | |
| 6,985,937 B1 | 1/2006 | Keshav et al. | |
| 7,197,014 B2 | 3/2007 | Katsuyama et al. | |
| 7,203,944 B1 | 4/2007 | van Rietschote et al. | |
| 7,725,572 B1 | 5/2010 | Kautzleben | |
| 7,765,256 B2 | 7/2010 | Doshi et al. | |
| 8,065,660 B1 | 11/2011 | Tanner et al. | |
| 8,150,037 B2 | 4/2012 | Luk et al. | |
| 8,291,416 B2 | 10/2012 | Cartales | |
| 8,627,334 B2* | 1/2014 | Archer | G06F 9/544 719/312 |
| 8,775,626 B2 | 7/2014 | Teather et al. | |
| 8,793,377 B2 | 7/2014 | Anderson, III et al. | |
| 8,954,587 B2 | 2/2015 | Gusak | |
| 9,047,136 B2 | 6/2015 | Thanga et al. | |
| 9,172,713 B2 | 10/2015 | Joffe et al. | |
| 9,319,300 B2 | 4/2016 | Huynh Van et al. | |
| 9,344,494 B2 | 5/2016 | Mordani et al. | |
| 9,460,711 B1* | 10/2016 | Vanhoucke | G10L 15/16 |
| 9,569,233 B2 | 2/2017 | Masters et al. | |
| 9,582,209 B2 | 2/2017 | Shih et al. | |
| 9,648,004 B2 | 5/2017 | Joffe et al. | |
| 9,911,212 B2* | 3/2018 | Fowler | G06T 11/40 |
| 9,960,964 B2* | 5/2018 | Alam | H04L 41/082 |
| 2002/0035647 A1 | 3/2002 | Brown | |
| 2002/0145978 A1 | 10/2002 | Batsell et al. | |
| 2002/0166031 A1* | 11/2002 | Chen | G06F 12/0813 711/141 |
| 2002/0194324 A1 | 12/2002 | Guha | |
| 2002/0194429 A1* | 12/2002 | Chiu | G06F 12/0813 711/118 |
| 2004/0010545 A1 | 1/2004 | Pandya | |
| 2004/0210320 A1 | 10/2004 | Pandya | |
| 2006/0069761 A1 | 3/2006 | Singh et al. | |
| 2006/0195444 A1* | 8/2006 | Sastry | G06F 16/2465 |
| 2008/0141264 A1 | 6/2008 | Johnson | |
| 2009/0049338 A1* | 2/2009 | Unnikrishnan | G05B 23/0281 714/26 |
| 2009/0125496 A1 | 5/2009 | Wexler et al. | |
| 2009/0168645 A1 | 7/2009 | Tester | |
| 2009/0172666 A1 | 7/2009 | Yahalom et al. | |
| 2010/0008248 A1 | 1/2010 | Constantine et al. | |
| 2010/0269109 A1 | 10/2010 | Cartales | |
| 2011/0047350 A1* | 2/2011 | Geissler | G06F 1/324 712/28 |
| 2011/0238546 A1 | 9/2011 | Certain | |
| 2012/0331135 A1 | 12/2012 | Alon | |
| 2013/0297907 A1 | 11/2013 | Ki et al. | |
| 2014/0032748 A1 | 1/2014 | Pruthi et al. | |
| 2014/0047342 A1 | 2/2014 | Breternitz et al. | |
| 2014/0068348 A1 | 3/2014 | Mondal | |
| 2014/0089735 A1 | 3/2014 | Barrett et al. | |
| 2014/0115579 A1 | 4/2014 | Kong | |
| 2014/0201425 A1 | 7/2014 | Clark et al. | |
| 2014/0215465 A1 | 7/2014 | Elzur | |
| 2014/0280488 A1 | 9/2014 | Voit et al. | |
| 2014/0310434 A1 | 10/2014 | Strange et al. | |
| 2014/0351809 A1 | 11/2014 | Chawla et al. | |
| 2014/0379894 A1 | 12/2014 | Allen et al. | |
| 2015/0071123 A1 | 3/2015 | Sabaa | |
| 2015/0081893 A1 | 3/2015 | Chadwell et al. | |
| 2015/0135185 A1 | 5/2015 | Sirota et al. | |
| 2015/0222696 A1 | 8/2015 | Park et al. | |
| 2016/0006756 A1 | 1/2016 | Ismael et al. | |
| 2016/0098455 A1 | 4/2016 | Curtin et al. | |
| 2016/0182328 A1 | 6/2016 | Bhasin et al. | |
| 2016/0275783 A1* | 9/2016 | Lewonig | G08B 25/04 |
| 2017/0034023 A1 | 2/2017 | Nickolov et al. | |
| 2017/0093964 A1* | 3/2017 | Barzik | H04L 67/104 |
| 2017/0126475 A1 | 5/2017 | Mahkonen | |
| 2017/0329645 A1* | 11/2017 | Chen | G06F 9/5027 |

OTHER PUBLICATIONS

Liu, "Development of TOSCA Service Templates for provisioning portable IT Services," Diploma Thesis, Institute of Parallel and Distributed Systems, University of Stuttgart (77 pages).

Kalantar et al., "Weaver: Language and Runtime for Software Defined Environments," IBM Journal of Research and Development 58, No. 2/3, 2014 (13 pages).

"Realizing the benefits of software-defined storage: an EMC perspective," EMC White Paper, Sep. 2013 (8 pages).

"VMware-Perspective-on-software-defined-storage-white-paper," White Paper, 2014 (18 pages).

"Integral Single Document Storage and Retrieval Guidelines," Integral SDS Procedures and Guidelines for Image Services, Release 4.1.2, Nov. 2008 (171 pages).

"Software-Defined Storage and VMWare's Virtual San Redefining Storage Operations," The TANEJA Group, Inc., Jul. 2014 (11 pages).

* cited by examiner

SELF-EXPANDING SOFTWARE DEFINED COMPUTING CLUSTER

CROSS-REFERENCE TO RELATED APPLICATIONS

This Application is a Continuation of U.S. patent application Ser. No. 14/865,522, filed on Sep. 25, 2015, the contents of which incorporated herein by reference.

FIELD OF THE INVENTION

The present invention relates generally to software defined computing, and specifically to a method for deploying self-expanding software defined computing clusters.

BACKGROUND

In software defined computing, a computing infrastructure is virtualized and delivered as a service. For example, in a software-defined storage (SDS) system storage hardware is separated from software that manages the storage infrastructure. In SDS, the software managing a software-defined storage environment may also provide policy management for features such as deduplication, replication, thin provisioning, snapshots and backup. By definition, SDS software is separate from the hardware it is managing, and can be implemented via appliances over a traditional Storage Area Network (SAN), or implemented as part of a scale-out Network-Attached Storage (NAS) solution, or as the basis of an Object-based storage solution.

The description above is presented as a general overview of related art in this field and should not be construed as an admission that any of the information it contains constitutes prior art against the present patent application.

SUMMARY

There is provided, in accordance with an embodiment of the present invention a method, including (a) initializing multiple computing nodes to execute one or more software applications that provide a computing service, each of the computing nodes having a respective set of configuration data; wherein the multiple computing nodes comprise one or more virtual machines, and wherein the respective set of configuration data for a given virtual machine comprises a first set of configuration data for the given virtual machine and a second set configuration data for the one or more software applications executing in the given virtual machine; (b) at a first time, deploying the multiple computing nodes as the software defined computing cluster; (c) at a second time subsequent to the first time, automatically and without user intervention, initializing, using a given set of configuration data based on each respective set of configuration data of the computing nodes of the software defined computing cluster, an additional computing node; and (d) adding the additional computing node to the software defined computing cluster thereby automatically provisioning the additional computing node to the software defined computing cluster.

BRIEF DESCRIPTION OF THE DRAWINGS

The disclosure is herein described, by way of example only, with reference to the accompanying drawings, wherein.

DETAILED DESCRIPTION OF EMBODIMENTS

Figure 1:
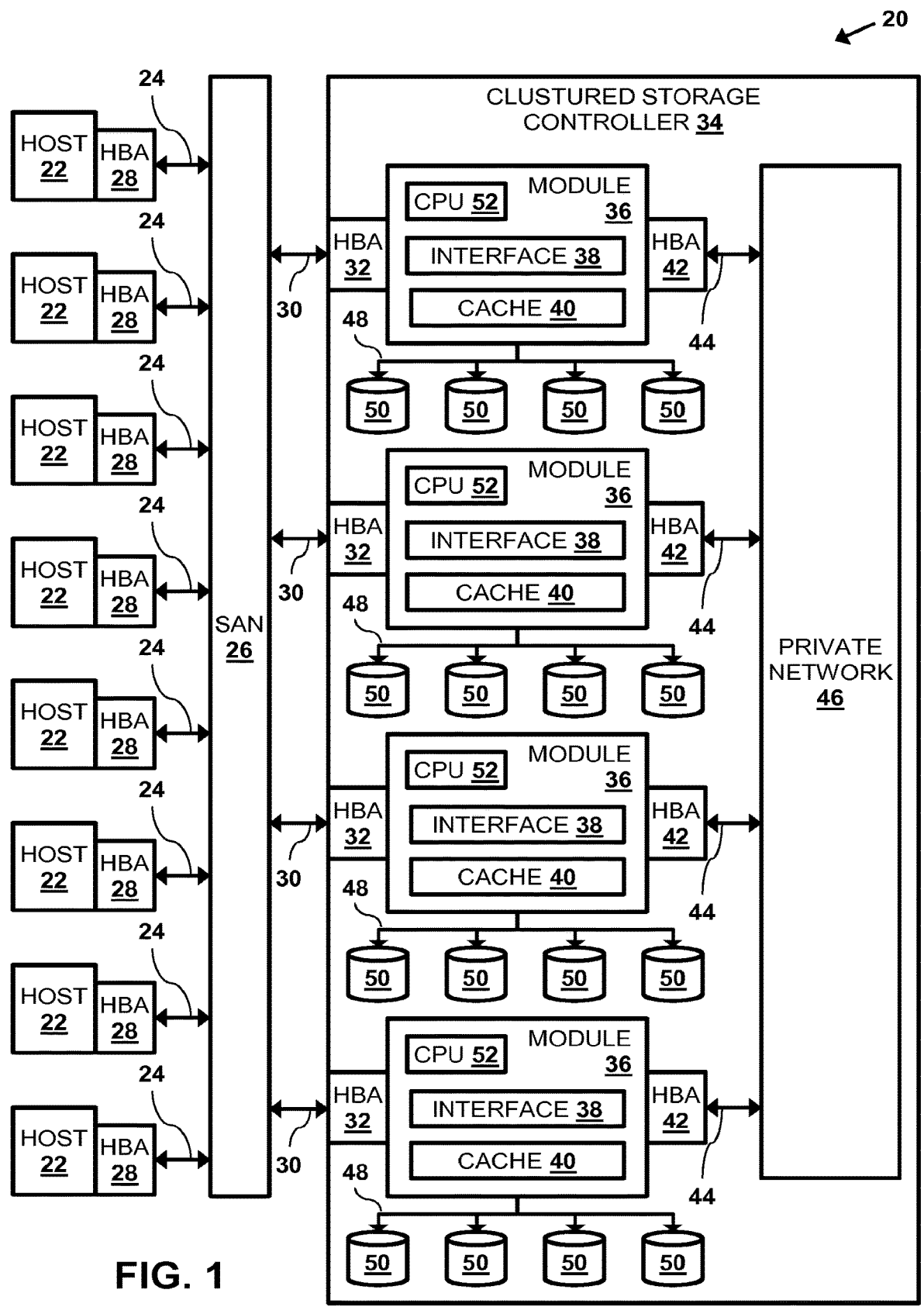
FIG. 1 is a block diagram that schematically illustrates a storage system comprising a storage controller configured to deploy a self-expanding software defined storage cluster, in accordance with an embodiment of the present invention.

A computing cluster comprises a set of loosely or tightly connected computers (also referred to herein as computing nodes) that execute software applications to perform a given task. In a computing cluster, the computing nodes are configured to work together so that they can be viewed as a single system.

Embodiments of the present invention provide systems and methods for enabling a software defined computing cluster (also referred to herein simply as a cluster) to add additional nodes to the cluster. As described hereinbelow, the software defined computing cluster can be initialized by configuring multiple computing nodes to execute one or more software applications that provide a computing service, each of the computing nodes having a respective set of configuration data. Subsequent to deploying the multiple computing nodes as a software defined computing cluster, a given set of configuration data is used to initialize an additional computing node, and the additional computing node is added to the software defined computing cluster.

In embodiments described herein, each of the sets of configuration data stores configuration information for a given software application that is executed in the cluster to provide the computing service. As described hereinbelow, depending on the configuration of the software defined computing cluster, the sets of configuration data may include configuration information for software containers and/or virtual machines.

In some embodiments, expanding the cluster can be performed automatically (i.e., without user intervention) upon detecting an internal condition. Examples of internal conditions include, but are not limited to, detecting a high utilization of the cluster, detecting that a network path to a given cluster is experiencing extended periods of high network traffic congestion, and detecting that a given storage device 50 in a given node is about to fail. In alternative embodiments, the cluster can be expanded in response to a user command to add additional capacity and/or additional services to the cluster.

When initializing the additional node in the cluster, information needed for the initialization (e.g., IP addresses of the new nodes) can be added manually. Alternately, the cluster software may request the information for the new modules from external systems. For example, if the nodes are implemented in virtual machines, the cluster software can request the information for the new nodes from an external orchestration system, or other external systems such as Dynamic Host Configuration Protocol (DHCP) server systems (i.e., for IP addresses).

Systems implementing embodiments of the present invention can generate an image for an additional node using the information stored in the sets of configuration data from the current cluster installation (i.e., the original cluster installation configuration plus any updates to the configuration that may include software updates and hotfixes), and install the additional node from within the cluster. Since the additional computing node can be initialized from within the software defined computing cluster itself (i.e., using software already executing in the cluster) any potential software compatibility issues can be reduced. Additionally, since most of the configuration input needed for the additional initialization can be obtained from the current cluster configuration, configuration compatibility issues and potential errors due to user input can be reduced. Furthermore, since embodiments of the present invention enable existing nodes in the cluster to configure and add an additional node to the cluster, an external computer system is not needed to configure and add the additional node.

FIG. 1 is a block diagram that schematically illustrates a data processing storage subsystem 20, in accordance with an embodiment of the invention. The particular subsystem (also referred to herein as a storage system) shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host bus adapters (HBAs). Clustered storage controller 34 implements clusters of storage modules 36, each of which includes a processor 52, an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, or solid state drives (SSDs) which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storages are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

While the configuration in FIG. 1 shows storage controller 34 comprising four modules 36 and each of the modules coupled to four storage devices 50, a given storage controller 34 comprising any multiple of modules 36 coupled to any plurality of storage devices 50 is considered to be with the spirit and scope of the present invention.

Figure 2:
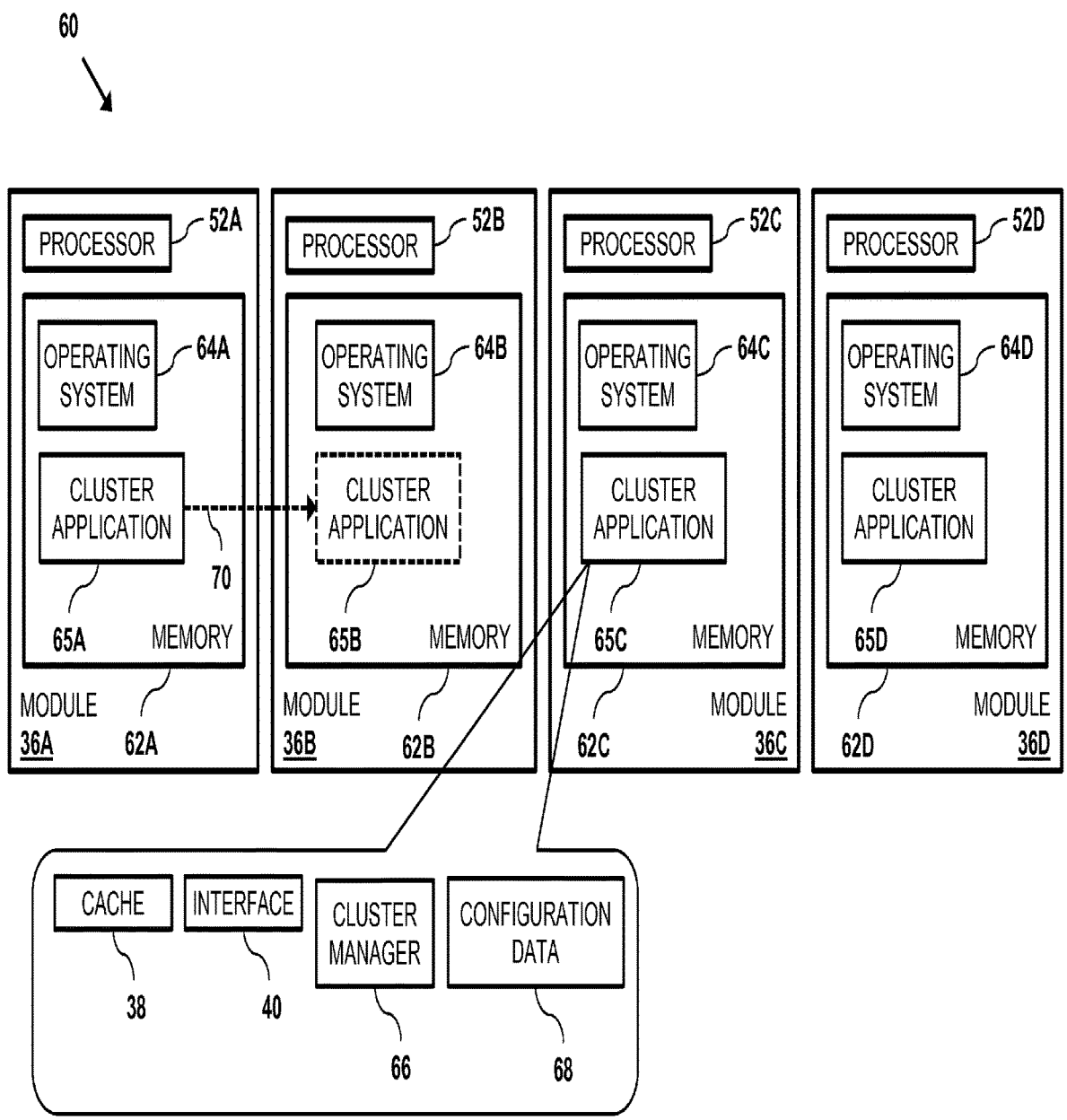
FIG. 2 is a block diagram that schematically illustrates a first configuration of the self-expanding software defined storage cluster implemented on the storage controller, in accordance with an embodiment of the present invention.

FIG. 2 is a block diagram that schematically illustrates a first configuration of a self-expanding software defined storage cluster 60 implemented on modules 36 of storage controller 34, in accordance with an embodiment of the present invention. In the configuration shown in FIG. 2, cluster 60 is implemented directly on hardware components of modules 36 (i.e., on "bare-metal servers" without any hardware abstraction). In FIG. 2 (and in the description referencing FIGS. 3 and 4 hereinbelow), modules 36 and their respective components are differentiated by appending a letter to the identifying numeral, so that the modules comprise modules 36A-36D.

Each module 36 comprises processor 52 and a memory 62 configured to store an operating system 64, and a cluster application 65 that comprises a software wrapper for cache 40, interface 38, a cluster manager 66, and a set of configuration data 68 (also referred to herein simply as configuration data 68). In embodiments of the present invention, configuration data 68 comprises configuration information for cache 40 and interface 38, and cluster manager 66 comprises a software installation application that processor 52A executes in order to use the configuration data to configure and add a new computing node to cluster 60 or to configure and add a new cluster 60.

In the example shown in FIG. 2, cluster 60 is initialized at a first time to comprise caches 40 and interfaces 38 executing in modules 36A, 36C and 36D. At a second time subsequent to the first time, cluster manager 66 uses the information in a given set of configuration data 68 to add cache 40B and interface 38B to cluster 60, as indicated by an arrow 70, thereby expanding cluster 60.

Figure 3:
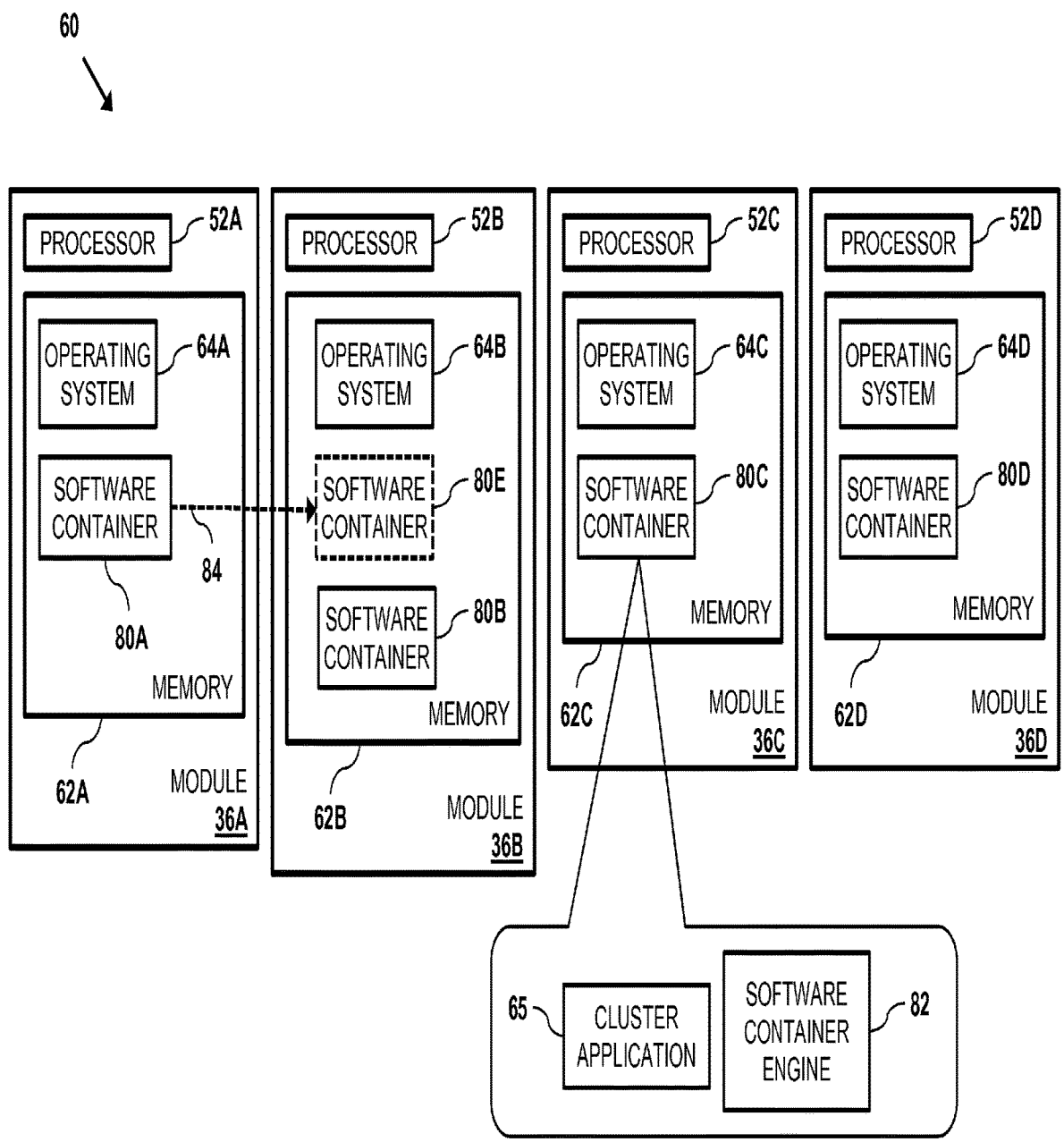
FIG. 3 is a block diagram that schematically illustrates a second configuration of the self-expanding software defined storage cluster implemented on the storage controller, in accordance with an embodiment of the present invention.

FIG. 3 is a block diagram that schematically illustrates a second configuration of a self-expanding software defined storage cluster 60 implemented on modules 36 of storage controller 34, in accordance with an embodiment of the present invention. In the configuration shown in FIG. 3, cluster 60 is implemented via software containers 80 executing in modules 36, each of the containers comprising a respective instance of cache 40, interface 38 and a software container engine 82 that manages execution of a given cache 40 and a given interface 38 using a given operating system 64 executing directly on a given processor 52 in a given module 36.

In the example shown in FIG. 3, cluster 60 is initialized at a first time to comprise software container 80A in module 36A, software container 80B in module 36B, software container 80C in module 36C, and software container 80D in module 36D. At a second time subsequent to the first time, cluster manager 66 uses the information in configuration data 68 to initialize and deploy an additional software container 80E to module 36B, as indicated by an arrow 84, thereby expanding cluster 60. In embodiments of the present invention comprising software containers 80, the given set of configuration data 68 used to add the additional software container to cluster 60 comprises a first set of configuration data 68 for initializing the additional software container, and a second set of configuration data 68 for initializing the software applications (i.e., additional instances of cache 38 and interface 40) in the additional software container.

Figure 4:
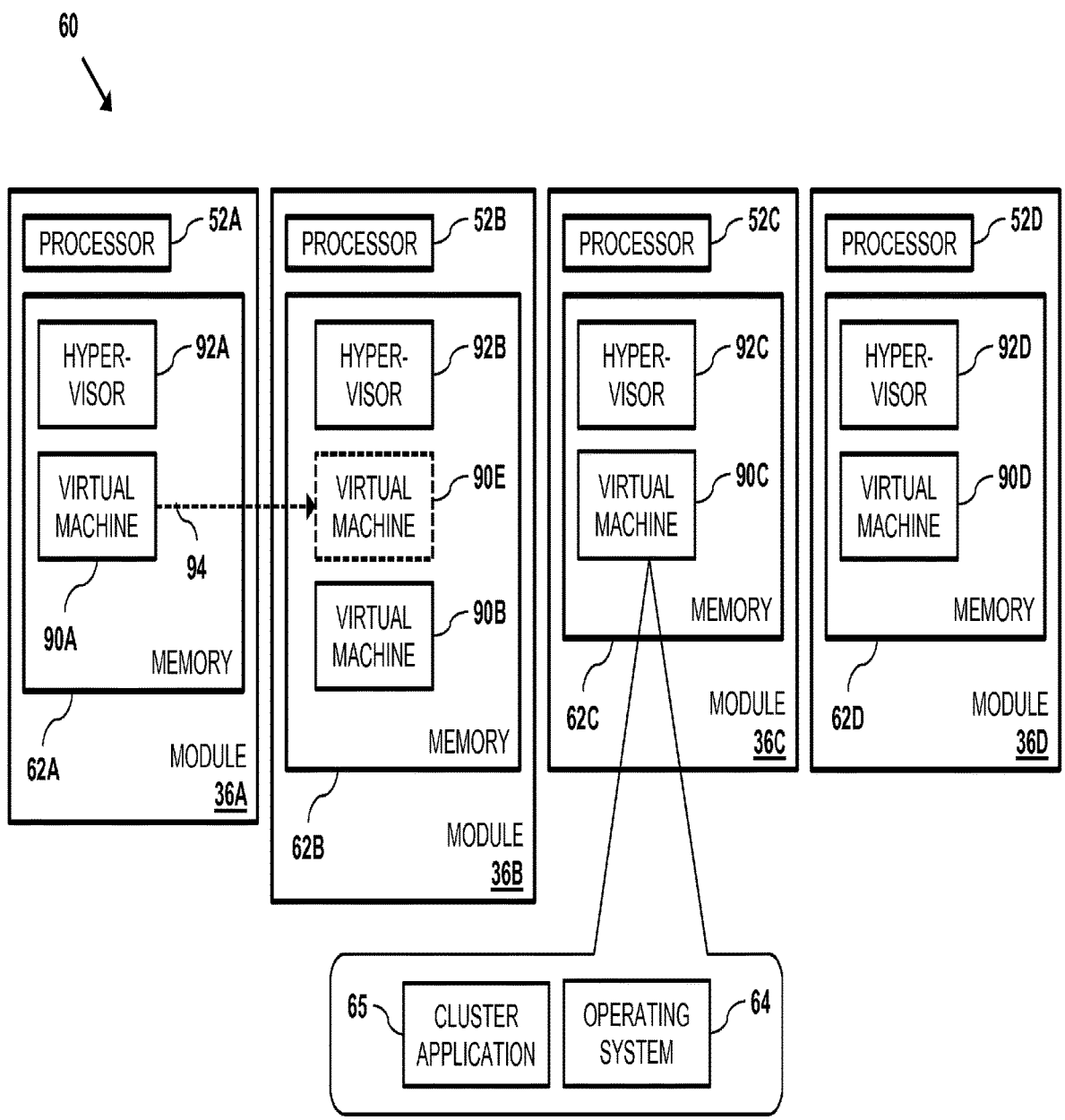
FIG. 4 is a block diagram that schematically illustrates a third configuration of the self-expanding software defined storage cluster implemented on the storage controller, in accordance with an embodiment of the present invention.

FIG. 4 is a block diagram that schematically illustrates a third configuration of a self-expanding software defined storage cluster 60 implemented on modules 36 of storage controller 34, in accordance with an embodiment of the present invention. In the configuration shown in FIG. 4, cluster 60 is implemented in virtual machines 90 executing on a hypervisor 92 in each module 36, each of the virtual machines comprising a respective instance of operating system 64 executing within its respective virtual machine, cache 40 and interface 38.

In the configuration shown in FIG. 4, cluster 60 is initialized at a first time to comprise virtual machine 90A in module 36A, virtual machine 90B in module 36B, virtual machine 90C in module 36C, and virtual machine 90D in module 36D. At a second time subsequent to the first time, cluster manager 66 uses the information in configuration data 68 to initialize and deploy an additional virtual machine 90E to module 36B, as indicated by arrow 94, thereby expanding cluster 60. In embodiments of the present invention comprising virtual machines 90, the given set of configuration data 68 used to add the additional virtual machine to cluster 60 comprises a first set of configuration data 68 for initializing the additional virtual machine (including an additional instance of operating system 64), and a second set of configuration data 68 for initializing the software applications (i.e., additional instances of cache 38 and interface 40) in the additional virtual machine.

In the examples shown in FIGS. 2-4, each of the computing nodes of self-expanding software defined computing cluster 60 comprise a given instance of cache 40 and a given instance interface 38 that are deployed and managed by cluster manager 66. In the example shown in FIG. 2, each of the computing nodes comprises a given module 36, in the example shown in FIG. 3, each of the computing nodes comprises a given software container 80, and in the example shown in FIG. 4, each of the computing nodes comprises a given virtual machine 90.

While FIGS. 2-4 show self-expanding software defined computing cluster 60 providing storage services (i.e., via caches 40 and interfaces 38), other types of services provided by the self-expanding computing cluster 60 are considered to be within the spirit and scope of the present invention. For example, self-expanding computing cluster 60 can be configured to provide other services such as processor intensive computational services and web services. Additionally, while FIGS. 2-4 show self-expanding software defined computing cluster 60 comprising computing nodes deployed on modules 36 of storage controller 34, deploying the self-expanding software defined computing cluster's computing nodes on other configurations of networked computers is considered to be within the spirit and scope of the present invention.

In some embodiments, software defined computing cluster 60 can be deployed using a combination of the configurations shown in FIGS. 2-4. For example, self-expanding software defined computing cluster 60 can be implemented as a combination of software containers 80 and virtual machines 90 deployed in modules 36.

Processors 52 comprise general-purpose central processing units (CPU) or special-purpose embedded processors, which are programmed in software or firmware to carry out the functions described herein. The software may be downloaded to modules 36 in electronic form, over a network, for example, or it may be provided on non-transitory tangible media, such as optical, magnetic or electronic memory media. Alternatively, some or all of the functions of the processors may be carried out by dedicated or programmable digital hardware components, or using a combination of hardware and software elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

SOFTWARE DEFINED CLUSTER EXPANSION

Figure 5:
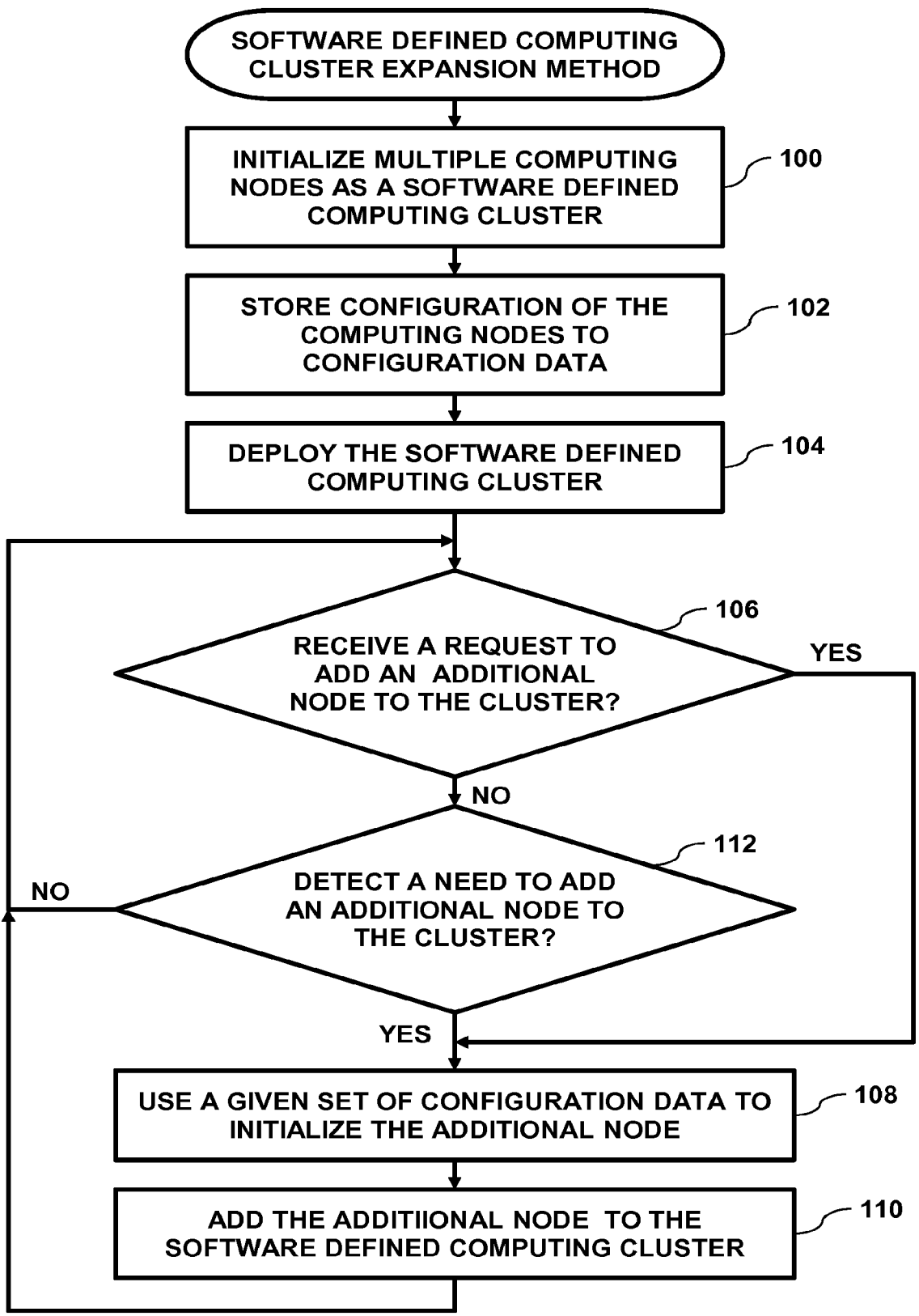
FIG. 5 is a flow diagram that schematically illustrates a method of expanding the software defined storage cluster, in accordance with an embodiment of the preset invention.

FIG. 5 is a flow diagram that schematically illustrates a method of expanding software defined computing cluster 60, in accordance with an embodiment of the present invention. In a first initialization step 100, a given processor 52 receives cluster application 65 from a cluster deployment application executing on a host computer, and cluster manager 66 (i.e., in the received cluster application) initializes the computing nodes, thereby configuring the nodes as self-expanding software defined computing cluster 60. In the configuration shown in FIGS. 1-4 the host computer executing the cluster deployment application comprises a given host computer 22. As described supra, each of the computing nodes may comprise a physical computing device (e.g., module 36), a given software container 80 or a given virtual machine 90.

In a storing step 102, cluster manager 66 stores configuration information of the computing nodes to configuration data 68, and in a deployment step 104, the cluster manager deploys self-expanding software defined computing cluster 60 comprising the initialized computing nodes. In a first comparison step 106, if cluster manager 66 receives a request to add an additional computing node to self-expanding software defined computing cluster 60, then the cluster manager uses one or more sets of configuration data 68 to initialize the additional computing node in a second initialization step 108 and adds the additional node to the self-expanding software defined computing cluster in an addition step 110, and the method continues with step 106.

The one or more sets of configuration data 68 that cluster manager 66 uses to initialize the additional computing node comprises current configuration data for software defined computing cluster 60. The current configuration data comprises the configuration information stored in step 102 plus any updates to the configuration data. In some embodiments, the updates to the configuration data may reference (or comprise) updates and/or hotfixes to software applications used by software defined computing cluster 60 (e.g., interface 40 and software container engine 82). Additionally, the updates to the configuration data may comprise the current configuration of the cluster and therefore reflect any changes to the configuration of the cluster since the first initialization step.

In some embodiments, cluster manager 66 may receive a request to add an additional computing node to self-expanding software defined computing cluster 60 in order to add a service. For example, if self-expanding software defined computing cluster 60 is providing file services, cluster manager 66 may receive a request to add an additional computing node to self-expanding software defined computing cluster 60 in order to add a backup service to the cluster.

Returning to step 106, if cluster manager 66 does not receive a request to add an additional computing node to self-expanding software defined computing cluster 60, then in a second comparison step 112, the cluster manages detects whether or not there is a need to add an additional computing node to the cluster. If computing cluster 60 detects a need to add an additional computing node to self-expanding software defined computing cluster 60, then the method continues with step 108. For example, if storage space on the currently deployed self-expanding software defined computing cluster is highly utilized, then cluster manager 66 can add an additional computing node that comprises additional storage space on storage devices 50. However, if computing cluster 60 does not detect a need to add an additional computing node to self-expanding software defined computing cluster 60, then the method continues with step 106.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
    initializing multiple computing nodes to execute one or more software applications that provide a computing service, each of the computing nodes having a respective set of configuration data; wherein the multiple computing nodes comprise one or more virtual machines, each of the one or more virtual machines executing on a hypervisor and executing an independent instance of an operating system, and wherein the respective set of configuration data for a given virtual machine comprises a first set of configuration data for the given virtual machine including configuration information for a cache and a cluster interface of each of the multiple computing nodes and a second set configuration data for the one or more software applications executing in the given virtual machine;
    at a first time, deploying the multiple computing nodes as the software defined computing cluster;
    at a second time subsequent to the first time, automatically and without user intervention, initializing, using a given set of configuration data based on each respective set of configuration data of the computing nodes of the software defined computing cluster, an additional computing node; and
    adding the additional computing node to the software defined computing cluster thereby automatically provisioning the additional computing node to the software defined computing cluster.

2. The method according to claim 1, wherein the computing service is selected from a group consisting of a storage service, a computational service and a web service.

3. The method according to claim 1, wherein the steps of initializing and adding the additional computing node are performed in response to detecting an internal condition in the software defined computing cluster.

4. The method according to claim 1, wherein the steps of initializing and adding the additional computing node are performed in response to receiving a request to add an additional service to the software defined computing cluster.

5. An apparatus, comprising:
    a communications network; and
    multiple computing nodes coupled to the communications network, a given computing node configured:
        to initialize the multiple computing nodes to execute one or more software applications that provide a computing service, each of the computing nodes having a respective set of configuration data; wherein the multiple computing nodes comprise one or more virtual machines, each of the one or more virtual machines executing on a hypervisor and executing an independent instance of an operating system, and wherein the respective set of configuration data for a given virtual machine comprises a first set of configuration data for the given virtual machine including configuration information for a cache and a cluster interface of each of the multiple computing nodes and a second set of configuration data for the one or more software applications executing in the given virtual machine, at a first time, to deploy the multiple computing nodes as the software defined computing cluster, at a second time subsequent to the first time, automatically and without user intervention, to initialize, using a given set of configuration data based on each respective set of configuration data of the computing nodes of the software defined computing cluster, an additional computing node, and to add the additional computing node to the software defined computing cluster thereby automatically provisioning the additional computing node to the software defined computing cluster.

6. The apparatus according to claim 5, wherein the computing service is selected from a group consisting of a storage service, a computational service and a web service.

7. The apparatus according to claim 5, wherein the given computing node is configured to initialize and add the additional computing node in response to detecting an internal condition in the software defined computing cluster.

8. The apparatus according to claim 5, wherein the given computing node is configured to initialize and add the additional computing node in response to receiving a request to add an additional service to the software defined computing cluster.

9. A computer program product, the computer program product comprising:

a processor executing instructions stored in a non-transitory computer readable storage medium having computer readable program code embodied therewith, the computer readable program code comprising:

computer readable program code configured to initialize multiple computing nodes to execute one or more software applications that provide a computing service, each of the computing nodes having a respective set of configuration data; wherein the multiple computing nodes comprise one or more virtual machines, each of the one or more virtual machines executing on a hypervisor and executing an independent instance of an operating system, and wherein the respective set of configuration data for a given virtual machine comprises a first set of configuration data for the given virtual machine including configuration information for a cache and a cluster interface of each of the multiple computing nodes and a second set of configuration data for the one or more software applications executing in the given virtual machine;

computer readable program code configured, at a first time, to deploy the multiple computing nodes as the software defined computing cluster;

computer readable program code configured, at a second time subsequent to the first time, automatically and without user intervention, to initialize, using a given set of configuration data based on each respective set of configuration data of the computing nodes of the software defined computing cluster, an additional computing node; and computer readable program code configured to add the additional computing node to the software defined computing cluster thereby automatically provisioning the additional computing node to the software defined computing cluster.

10. The computer program product according to claim 9, wherein the computing service is selected from a group consisting of a storage service, a computational service and a web service.

11. The computer program product according to claim 9, wherein the computer readable program code is configured to initialize and add the additional computing node in response to detecting an internal condition in the software defined computing cluster.

12. The computer program product according to claim 9, wherein the computer readable program code is configured to initialize and add the additional computing node are performed in response to receiving a request to add an additional service to the software defined computing cluster.

* * * * *